United States Patent [19]
See

[11] 3,981,521
[45] Sept. 21, 1976

[54] BRUSH GUARD FOR TRACTOR

[76] Inventor: Roy H. See, Rte. 1, Bidwell, Ohio 45614

[22] Filed: June 5, 1975

[21] Appl. No.: 584,112

[52] U.S. Cl. ................................ 280/760; 280/163
[51] Int. Cl.² .......................................... B60R 19/00
[58] Field of Search ........ 280/150 R, 152 R, 153 R, 280/727, 760, 770, 163, 164 R; 172/81, 297, 508, 514, 517

[56] References Cited
UNITED STATES PATENTS

| | | | |
|---|---|---|---|
| 1,596,537 | 8/1926 | Hintz | 280/150 R |
| 1,785,588 | 12/1930 | McClain | 172/517 |
| 2,529,998 | 11/1950 | Burke | 280/150 R |
| 2,561,444 | 7/1951 | Martin | 280/150 R X |
| 2,876,851 | 3/1959 | Gillette | 172/81 X |

Primary Examiner—M. H. Wood, Jr.
Assistant Examiner—Michael J. Forman
Attorney, Agent, or Firm—Sidney W. Millard

[57] ABSTRACT

A brush guard attached to the side of a tractor between the front and rear wheels. Deflector bars attached to the outer extension of a cross-piece prevent branches from springing up and striking the tractor driver after the front axle of the tractor has passed over the vegetation and before the rear axle begins to deflect the same vegetation downward. The deflector bars and cross-piece also prevent large obstructions from slipping between the wheels and coming to rest against an axle, thereby immobilizing the tractor when, due to the slope of the terrain the tractor cannot drive itself away from the obstruction.

10 Claims, 6 Drawing Figures

BRUSH GUARD FOR TRACTOR

BACKGROUND OF THE INVENTION

This invention is concerned with brush guards for connection to tractors operated in rugged country and where the tractor has equipment attached which is designed to cut brush. There are several concurrent hazards in brush cutting operations and probably the most dangerous is the problem of small trees or shrubs which will bend when the front axle of the tractor moves over them and whip upwardly to strike the tractor driver in the face or on other parts of his anatomy when it is released by the front axle passing over it and before the rear axle comes into contact. Additionally, when the brush cutting is taking place on a hillside, the tractor will often slide sideways and a large tree can hook inside the wheels and against the axle; where the incline is great enough, the tractor may be unable to push or pull itself out of the locked position.

Another hazard is the brush, rocks, etc. which may be thrown up by the brush cutter attached to the rear of the tractor and a screen for protecting the driver from rearwardly projected objects is illustrated in the patent to McFerron, U.S. Pat. No. 3,704,030. The concept solves a problem unrelated to this invention.

The patent to Hedquist et al, U.S. Pat. No. 2,451,553 discloses a sheet metal frame for protecting a tractor driver in an orchard environment. However, the structure is extremely bulky and inadequate to prevent large tree trunks or other obstructions from lodging behind the front wheels on a slope.

The patent to McClain, U.S. Pat. No. 1,785,588 is concerned with cultivation and includes a frame for guiding plants out of alignment with the rear wheel of the tractor but includes structure which would make even more difficult the avoiding of large tree trunks being pulled into the area inside the wheels of the tractor.

The patent to Kruse, U.S. Pat. No. 3,078,929, is directed to a cultivator with a sheet metal housing designed to direct bushes out of contact or alignment with the wheels but is totally inadequate for the deflecting structure needed herein.

The patent to Willey, U.S. Pat. No. 2,690,342, includes crop diverting fenders which prevent the crops from being crushed by the wheels.

Unfortunately, none of these patents mentioned above goes to the heart of the matter and the instant invention is designed to alleviate the specific problems enumerated.

SUMMARY OF THE INVENTION

The guard of this invention consists of metal bars forming a framework to be bolted to the side of the tractor. It includes a cross-piece projecting outward from the tractor about equidistant between the front and rear axles and projecting forwardly and rearwardly of the cross-piece are deflecting bars. The cross-piece prevents trees, bushes, etc. from springing up after they are passed over by the front tractor axle and the deflector bars fill the space between the two wheels to prevent incursion into the area between the wheels by rocks, trees, or the like, where the tree, et al projects above the front axle.

DESCRIPTION OF THE PREFERRED EMBODIMENTS

Figure 1:
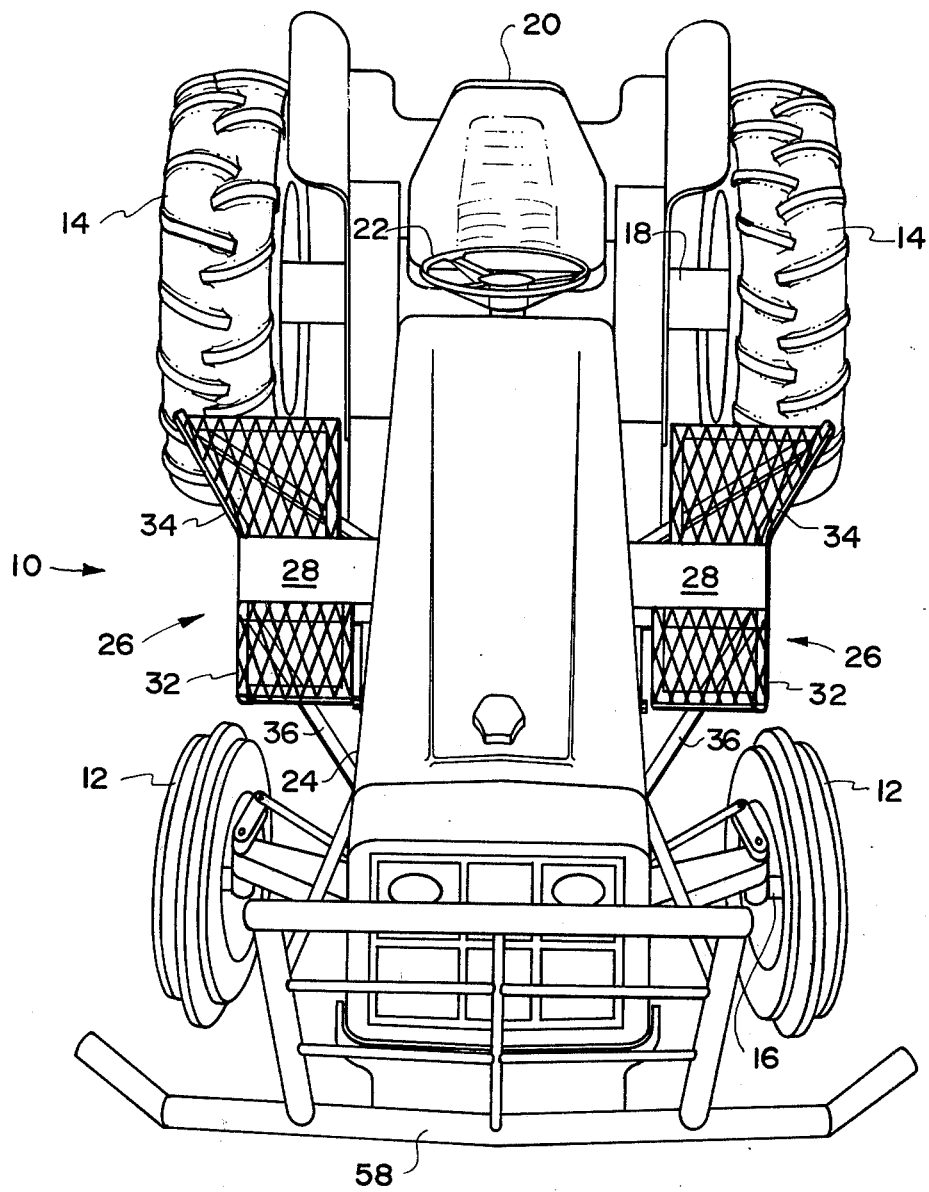
FIG. 1 is a perspective view of a tractor incorporating the brush guard invention.

Referring to FIG. 1, a conventional tractor 10 as used in brush cutting operations includes front wheels 12 and rear wheels 14 mounted on axles 16 and 18 respectively. It includes a conventional driver seat 20, steering wheel 22 and tractor body 24. For convenience, the brush cutter itself is not illustrated.

Brush guards, indicated generally at 26, are mounted on each side of the tractor and for convenience, only one brush guard will be described, the guard being best seen in FIGS. 2–5. A cross-piece 28 of generally L-shaped configuration is bolted to the body of the tractor by bolts 30 and its outermost edge is welded to a bar which extends forward of the cross-piece 28 to form a front deflecting bar 32 and to the rear of the cross-piece to form a rear deflecting bar 34.

The front deflecting bar 32 projects forward to within a few inches of one front wheel 12. The spacing between wheel 12 and bar 32 is only as much as needed to allow the wheels to turn without encountering the bar 32. Any obstruction of a size to pass between the front extension of the deflecting bar 32 and the front wheel 12 would be small enough that it would create no problems for the tractor to drive over it or pull it out of the ground.

The rearwardly extending deflecting bar 34 projects backwardly and outwardly from the cross-piece 28 to within an inch or so of the rear wheel. This is possible because the rear wheels do not turn about a vertical axis as do the front wheels. This close relationship virtually prevents any obstructions from passing between the rearmost extension of the rear deflecting bar 34 and the rear wheel 14.

Figure 2:
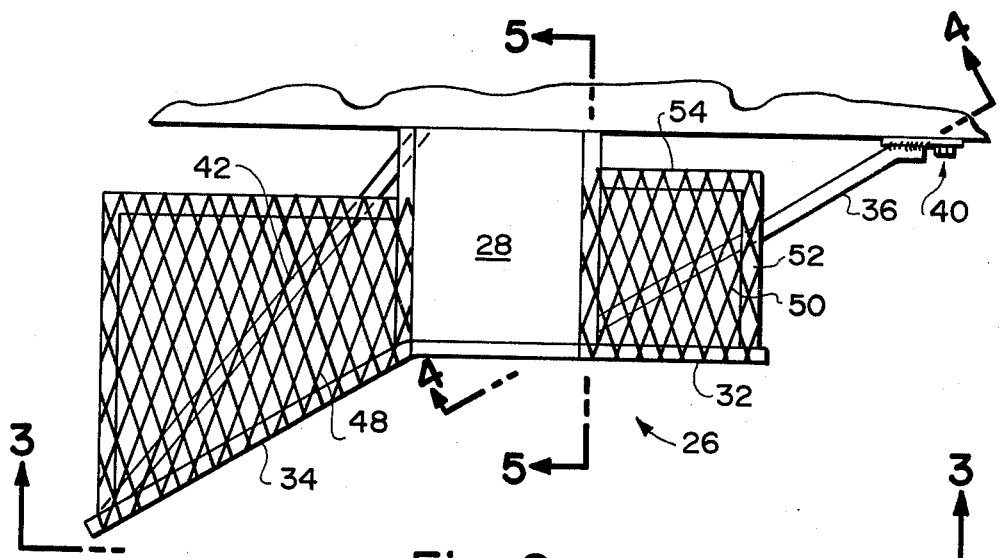
FIG. 2 is a plan view of the brush guard itself.
Figure 3:
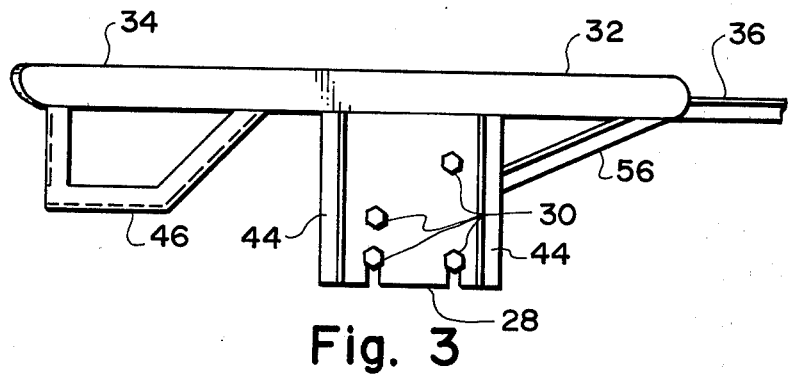
FIG. 3 is a side elevational view of the brush guard of FIG. 2, taken along line 3—3 of FIG. 2.
Figure 4:
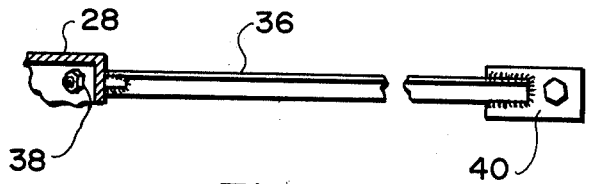
FIG. 4 is a fragmentary sectional view of a connection of the guard to the tractor, taken along line 4—4 of FIG. 2.
Figure 5:
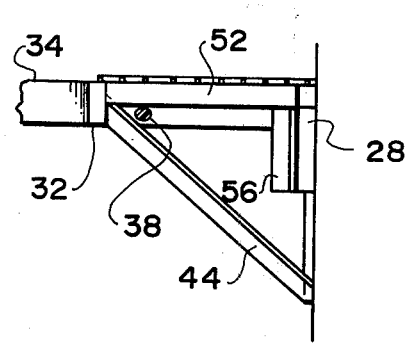
FIG. 5 is a fragmentary front elevational view of the brush guard, taken along line 5—5 of FIG. 2.
Figure 6:
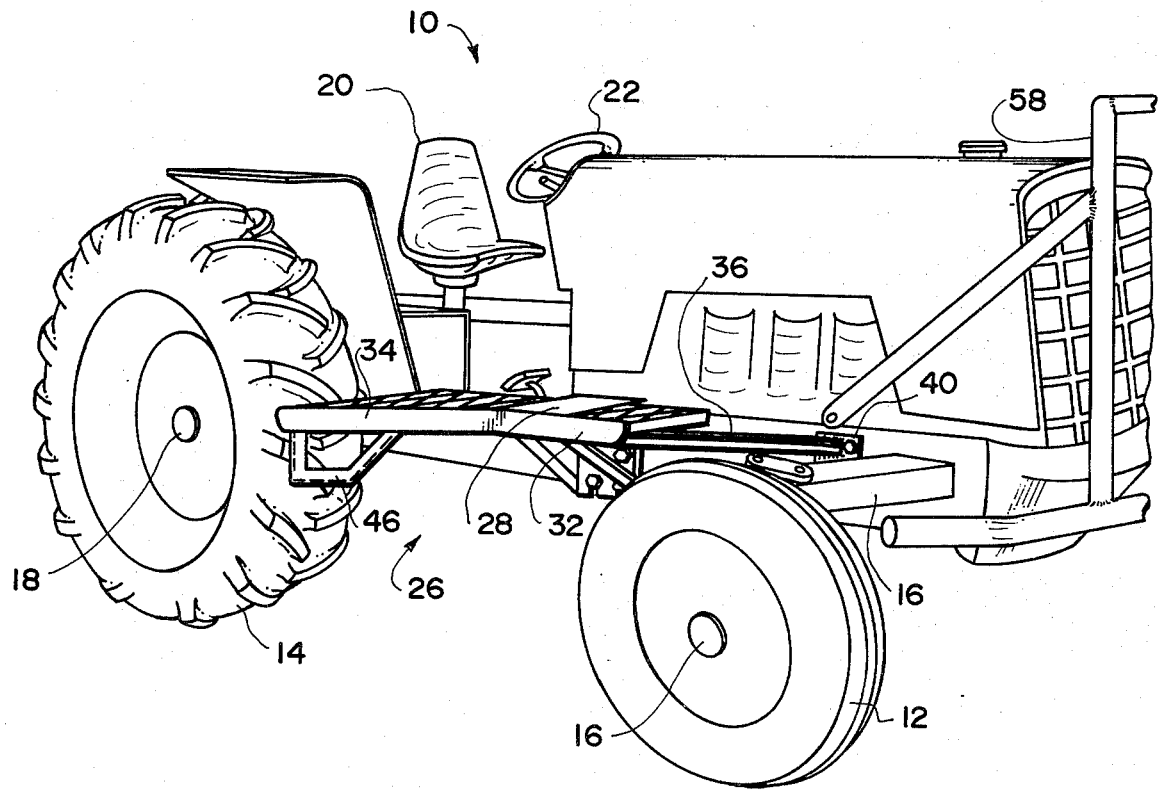
FIG. 6 is an elevational view of a tractor having the brush guard of this invention mounted thereon.

To provide structural stability of the whole guard 26 a first bar 36 is connected to the outer area of the cross-piece 28 and projects forward to be bolted to the body of the tractor, best seen in FIG. 2. While the first bar 36 is shown bolted at 38 to the cross-piece 28 (see FIG. 4) and bolted at 40 to the tractor body 24, it is clear that the structures could be welded or otherwise mechanically attached together to serve the structural need of bracing. Structural strength is achieved by making the first bar 36 approximately parallel with the rearward and outwardly extending rear deflector bar 34. The two are approximately aligned although they are slightly offset.

A reinforcing bar 42 is welded to the outer end of the rear deflecting bar 34 and to the inner area of the cross-piece 28 to provide structural stability. It will be clear that in most cases the tractor will be moving forward when it engages a large rock or tree and that the impact taken by the guard 26 which will tend to deflect the guard rearwardly. However, with the corners of the structure being relatively stationary and welded and/or bolted in place the impact would have to be in the extreme to deform the brush guard. As can clearly be seen from the drawing, a tree 2 or 3 inches in diameter passed over by the front axle 16 could not spring up into the area between wheels 12 and 14 because of the cross-piece 28 and the first bar 36, the two would hold the tree down until it passed under the reinforced bar 42 and then it would again be held down by the rear axle 18. When it springs up behind the tractor it is moving away from the driver sitting in seat 20 and is no substantial problem. Brace bars 44 extend diagonally downward from the outermost extension of the cross-piece 28 (downward and inward) to the tractor body where they are welded or bolted to the downward extension of the cross-piece 28, best illustrated in FIG. 5.

A step 46 formed in a generally U-shaped configuration of angle iron is welded to the rear deflector bar 34 to ease the mounting of the tractor. The forward section of the U-shaped step is inclined forwardly at an angle of about 45° to minimize its ability to hold brush which must pass down and under the step.

An added feature comprises expanded steel screens 48 and 50 which stretch over the open spaces between most of the framework of the brush guard and they serve as safety features to prevent someone from stepping through the holes. Appropriate bracing angles 52, 54, and 56 support the forward most screen 50 and similar angles (unnumbered) serve to brace the rearmost screen 48.

While the invention herein disclosed is particularly designed to act as a brush guard to protect the driver, those who are familiar with the operation of such tractors will understand the tremendous safety feature provided by the guard at the particular location shown. Because of the size of a tractor, when one is working on the machine, checking some part of the motor, or perhaps instructing his son on the proper way of shifting gears, etc. it is almost axiomatic that he will stand in the cavity at the side of the tractor between the front and rear wheels. If the tractor is on a slight incline and the motor is started for some reason or the tractor is accidentally shifted into gear the tractor might start moving forward or rearward and many farmers have been crushed by the wheels of their tractor while in such positions. With the brush guard mounted in place as shown in the drawing such accidents will almost be eliminated. Anyone working on the tractor will be sitting or lying on the brush guard. Anyone instructing his driver will stand on the brush guard or be standing beyond the brush guard where he is in no danger.

The framework 58 mounted on the front of the tractor in a lattice formation, likely would have screen over it and it is designed to protect the grill of the tractor when moving through heavy brush and the like. The lowermost extension of the lattice work 58 is at, or slightly below, the elevation of the front axle and the lowermost portion of the brush guard 24 is at an elevation no lower than the lowermost extension of the lower of the two axles 16 and 18. The reason for this is that anything lower than the front axle will not pose a significant problem for the driver. If the lower axle will pass over the projection then the projection will not hang up the tractor and it will not snap up and injure the driver. For this reason, there is no reason to have the brush guard 26 or the lattice 58 extend lower than the axle 16.

The brush guard itself is designed to keep obstructions which extend higher than the lowermost axle from the generally trapezoidal area defined by the two axles and two imaginary lines extending from approximately the center of rotation of each of the wheels on each side of the tractor. If obstructions are kept out of this area, the driver is relatively safe from being struck by brush springing upwards or trees hanging up the tractor by incursion between a wheel and the body of the tractor.

Having thus described the invention in its preferred embodiment, it will be clear to those having ordinary skill in the art that obvious modifications might be made to the structure without departing from the spirit of the invention. Specific language used by the inventor to describe the invention is not intended to be limiting on the scope of the invention. Rather, it is intended that the scope of the invention be limited only by the appended claims.

I claim:

1. Apparatus for mounting on a tractor having both a front and a rear axle with wheels on each end of each axle, said apparatus serving to (1) protect the driver from branches whipping upward after they are passed over by the front axle and (2) prevent obstructions which project upward above the level of either axle from immobilizing the tractor by passing into the zone defined by the two axles and two imaginary lines extending longitudinally from each end of the front axle to the end of the rear axle, on the same side of the tractor, the ends of the two lines being about at the center of rotation of each wheel, the apparatus comprising two guards, one for each side of the tractor, each guard including a first bar attached to the tractor body at a spot above the level of the front axle, each said bar extending outward and backward from said tractor body generally toward the outside peripherial edge of the adjacent rear wheel, each said bar being attached to a separate cross-piece, each cross-piece being attached to one side of the tractor body about equidistant between the front and rear axles, each cross-piece extending outwardly from the tractor body a distance about equal to the distance of the adjacent front wheel from the tractor body, a front deflector bar being attached to and extending from each cross-piece toward the center of rotation of the adjacent front wheel, each deflector bar terminating just short of the rearmost extension of the adjacent wheel, a rear deflector bar on each side of the tractor being attached to and extending from the adjacent cross-piece toward the outermost periphery of the adjacent rear wheel, each rear deflector bar terminating just short of the forwardmost extension of the adjacent wheel, all parts of said guard being disposed at a level at least as high as the lowermost portion of either axle.

2. The apparatus of claim 1 wherein one rear deflector bar and one first bar which are located on the same side of the tractor are disposed approximately parallel.

3. The apparatus of claim 2 including a reinforcing bar for each guard, each said reinforcing bar extending from and attached to (1) a rear deflector bar near where it terminates near the rear wheel and (2) the cross-piece at a location inward toward the tractor body from where the rear deflector bar and the cross-piece are attached.

4. The apparatus of claim 3 including a brace bar extending from about the outermost end of the cross-piece downward and inward to the tractor body to brace the cross-piece against vertical deflection.

5. The apparatus of claim 2 including a brace bar extending from about the outermost end of the cross-piece downward and inward to the tractor body to brace the cross-piece against vertical deflection.

6. The apparatus of claim 5 including a generally U-shaped step extending downwardly from the rear deflector bar, the forwardmost portion of the U-shaped step extending upwardly at an angle about 45° from a horizontal plane.

7. The apparatus of claim 2 including a generally U-shaped step extending downwardly from the rear deflector bar, the forwardmost portion of the U-shaped step extending upwardly at an angle about 45° from a horizontal plane.

8. The apparatus of claim 1 including a brace bar extending from about the outermost end of the cross-piece downward and inward to the tractor body to brace the cross-piece against vertical deflection.

9. The apparatus of claim 8 including a generally U-shaped step extending downwardly from the rear deflector bar, the forwardmost portion of the U-shaped step extending upwardly at an angle about 45° from a horizontal plane.

10. The apparatus of claim 1 including a generally U-shaped step extending downwardly from the rear deflector bar, the forwardmost portion of the U-shaped step extending upwardly at an angle about 45° from a horizontal plane.

* * * * *